Figures 1, 2, 3:
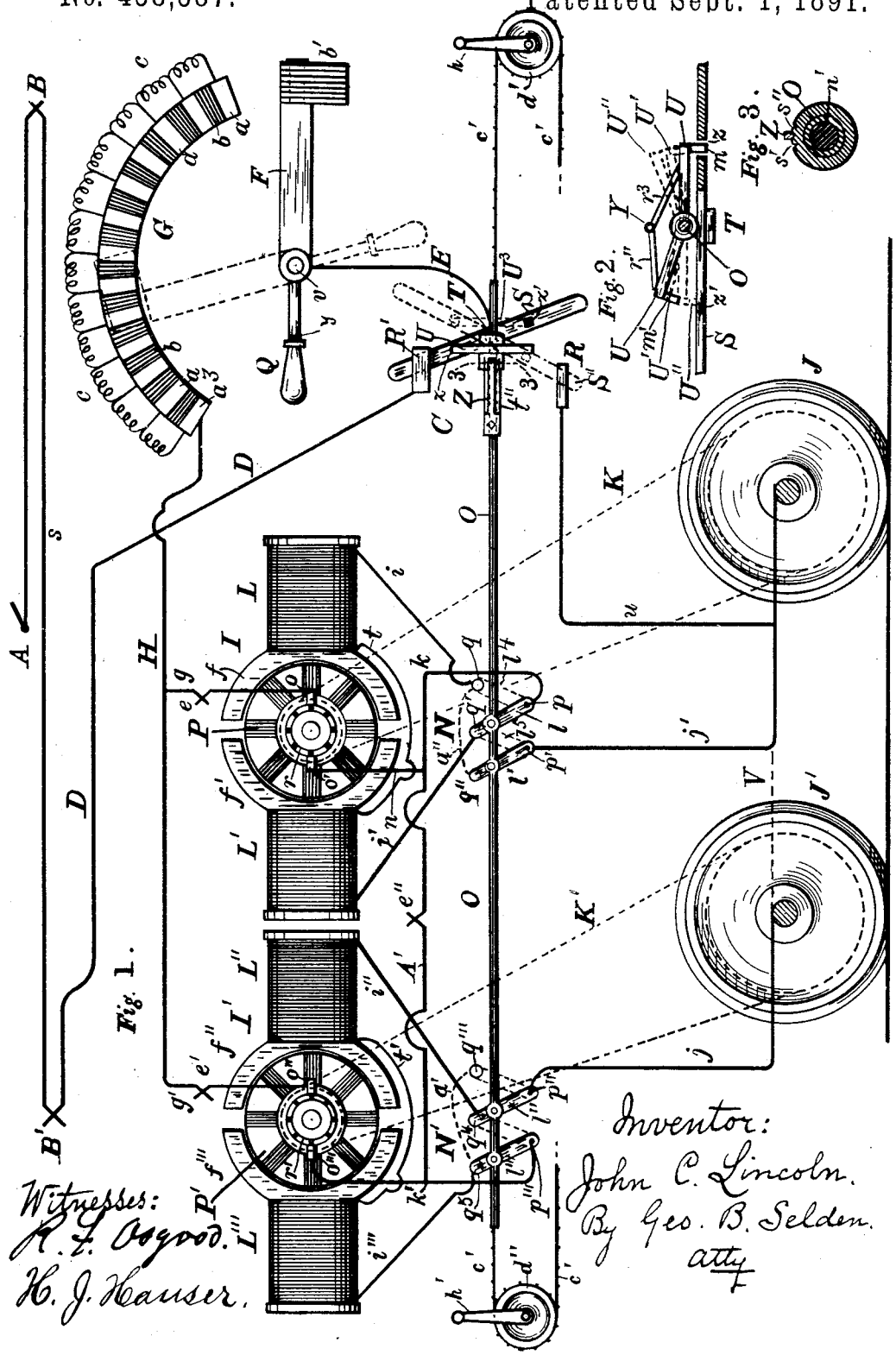

(No Model.)

J. C. LINCOLN.
ELECTRIC BRAKE.

No. 458,587. Patented Sept. 1, 1891.

Witnesses:
R. F. Osgood.
H. J. Hauser.

Inventor:
John C. Lincoln.
By Geo. B. Selden.
atty

UNITED STATES PATENT OFFICE.

JOHN C. LINCOLN, OF ROCHESTER, NEW YORK.

ELECTRIC BRAKE.

SPECIFICATION forming part of Letters Patent No. 458,587, dated September 1, 1891.

Application filed February 24, 1891. Serial No. 382,336. (No model.)

*To all whom it may concern:*

Be it known that I, JOHN C. LINCOLN, a citizen of the United States, residing at Rochester, in the county of Monroe, in the State of New York, have invented an Improved Electric Brake for Electric Cars, of which the following is a specification, reference being had to the accompanying drawings.

My invention relates to an improved electric brake for electric cars, in which the electromotor itself is employed as a brake by using it as a dynamo and sending the electric current thus produced through a variable resistance.

My invention is fully described and illustrated in the following specification and the accompanying drawings, the novel features thereof being specified in the claims annexed to the said specification.

In the accompanying drawings, the diagram Figure 1 represents the manner of applying my invention to an electric car. Fig. 2 is a side view of the brake-switch. Fig. 3 is a section through the hub of the brake-switch arm.

In the accompanying drawings, which represent the manner of applying my invention to electrically-propelled cars, A represents a suitable source of electricity, (preferably the overhead wire or trolley system;) C, the brake-switch; G, the rheostat or variable resistance; I I', the electromotors; J J', the wheels which support the vehicle, and N N' the reverse-switches. Two electromotors are represented in the drawings; but it will be understood that my invention can be employed in connection with a single electromotor.

O is a rod, chain, or other suitable connection, by which the brake-switch and the reverse switch or switches are connected together, so as to be simultaneously operated. The electromotors are connected with the wheels J J' in any suitable manner, operating devices, such as gearing, chains, or belts, being employed, if necessary, such means of driving the wheels from the motor or motors being indicated by the dotted lines K K'.

The electromotors are of any ordinary or preferred construction, the field-magnets being represented by L L' L'' L''', the armatures by P P', and the pole-pieces by $f f' f'' f'''$. The commutators are represented at $r r'$.

Proceeding now to a more detailed description of the manner of applying my invention to an electric car, it will be perceived that the current of electricity supplied to the car at A from a suitable source of supply—such as an overhead trolley-wire—is conducted to the switch B, and thence to the switch B' at the opposite end of the car by the wire $s$, and thence to the rheostat and motor or motors through the brake-switch C and the conductors D E H $g$ $g'$. The commutators of the motors are represented at $r r'$, and from them the electric current passes by the conductors $k k'$ to the reverse-switches N N', and thence to the field-magnet coils by the wires $i i' i'' i'''$. From the reverse-switches the current passes to ground through the wires $j j'$, or, to what is practically the same thing, to the frame or axles of the truck-wheels.

During the forward movement of the car the electric current pursues the path already described; but when it is desired to arrest the movement and stop the car the current is broken by throwing the arm F off of the rheostat. The reversing switch or switches and the braking-switch are now thrown, and the momentum of the car operates to drive the motors, causing them to act as dynamos and to generate a current, as soon as the circuit is completed, by replacing the arm F on the rheostat. At this time the current passes from the brush $o$, in contact with the commutator $r$, through the conductors $g$ and H, to the rheostat G, and thence through the arm F (when in contact with the contact-plates of the rheostat) to the pivot $v$, and thence through the wire E to the pivot T of the blade S of the brake-switch C. The blade S now occupies the position indicated by the dotted lines S', and consequently the current passes from the pivot T to the contact-plate R, and thence through the wire $u$ to the wire $j'$, which conducts it to the pivot $p'$ of one of the blades $l'$ of the reversing-switch N. The blade $l'$ now occupies the position indicated by the dotted lines $l^5$, so that the current passes from the pivot $p'$ to the contact $q'$, and thence by wire $i'$ to the coil of the field-magnet L'. The coil of the field-magnet L is connected to the coil of the other field-magnet L' by the wire $t$, and from the magnet L the current flows through the wire $i$ to the contact $q$, and thence through the blade $l$ at $l^4$ to the pivot $p$, and thence through the wires $k$ and $n$ to the brush $o'$, and through the commutator and the armature-coils to the brush $o$, the place of starting. Instead of passing to ground the current on the wire $u$ passes through the wire $j'$ to the reverse-switch.

When the line-circuit is broken and the motor is used as a generator, the direction of the current through the field-magnets would be contrary to that which traverses them when operating as a motor, and as this would impair or destroy the residual magnetism of the field-magnets it is necessary to provide means by which the current may be maintained in the same direction through the field-magnets when the motor becomes a brake as when it is operating to propel the car. This result I accomplish by the reversing-switch N, or some equivalent device. When the motor is used as a generator, the direction of the current traversing the armature will be reversed. This current is at first due to the residual magnetism of the field-magnets, and unless the field-magnet connections are reversed flows through the field-magnet coils in a direction to weaken the residual magnetism, and so to weaken the current still further. On this account the machine will not build up or increase the strength of the current. If, however, the field-magnet connections be reversed, the residual current flows through the field-magnet coils in a direction to strengthen the residual magnetism, and on account of a stronger field to produce more current. It will be seen that in order to build up the current it is necessary to send the current around the field-magnet coils in the same direction as the current that imparted the residual magnetism. In case more than one electromotor is used the arrangement of the wires and switches is such that the current from the second motor is conveyed in a manner analogous to that already described through the brake-switch C and the rheostat, the current passing from $j$ to $u$ through the truck-frame or the rail, or a direct connection may be made, as indicated by the dotted line V.

While the car is being stopped the motor-man adjusts the resistance by operating the arm F by the handle or lever Q, thus altering the resistance in circuit and absorbing the energy of motion of the car in proportion to the amount of current generated.

The intensity of the brake-action is controlled by the amount of resistance the current overcomes in the rheostat, and is most intense when the rheostat is completely short-circuited—that is, when the arm F is in contact with the plate $a^3$. The action is so intense, as demonstrated by actual trial, that the wheels may be caused to slide on dry rails by properly adjusting the resistance.

The rheostat G is of any ordinary or suitable construction. In the accompanying drawings I have represented the rheostat as consisting of a series of contact-plates $a$, arranged in circular form, and having the insulating material $b$ interposed between them, while the contact-plates are connected by any suitable material, such as the coils $c$, formed of a substance of high resistance. The swinging arm F is provided on its free end with the movable plates $b'$, which come in contact with the plates $a$ and complete the circuit through the coils $c$. The motor-man, by swinging the arm F by means of the handle Q, can introduce or cut out more or less resistance, according to the position of the arm F and the number of the coils $c$, through which the current is compelled to travel. In the position shown by the full lines in Fig. 1 the arm F, however, is entirely out of contact with the rheostat and the current entirely cut off. Any other suitable form of adjustable resistance may, however, be used in connection with my invention. It will, of course, be understood that while the rheostat and its arm will be placed under the body of the car, or on the truck-frame, the handle Q must be located conveniently within the control of the motor-man, and that consequently the pivot or rod of the arm F must extend upward through the car-floor or other suitable connecting mechanism employed, whereby the rheostat is placed under control. It will also be understood that the handle should be insulated from the current passing through the rheostat, such insulation being indicated at $z$, Fig. 1. It will be also understood, in a similar manner, that in order to show clearly the construction and mode of operation of my improved electric brake some of the details of construction have been omitted from the accompanying drawings, which the electrical constructor will readily supply in accordance with the customary practice in such devices. Thus, for instance, the switches will require to be provided with suitable bases and insulation. The conductor D will be provided with a suitable fuse-box. The wires $g\ g'$, and $h'$ are provided with the switches $e\ e'\ e''$, whereby either one of the motors may be cut out of the electric circuit and its use discontinued both for propulsion and braking. The rod O or other mechanism by which the switches are connected together, so as to be operated simultaneously, will require to be insulated, (in practice I have used a wooden rod for this purpose.) The car should ordinarily be provided with handles or levers for controlling the switches and the rheostats from both of its ends. The motors are placed in immediate proximity with the axles of the truck-wheels, being geared thereto in any suitable manner. Insulation will be supplied wherever the same is necessary. The rheostat G employed for braking is the same as is used for controlling the current received from the trolley-wire; but another and independent rheostat may be employed, especially in applying my invention to systems of electrical propulsion in which the rheostat is dispensed with, and many other alterations or modifications may be made in the apparatus without departure from the principles of my invention.

The switches are conveniently applied to the lower side of the body of the car, provision being made for operating the connecting-rod O by the chains and sprocket-wheels $c'$ $d'$ $d''$ and the handles $h$ $h'$ at either end of the car.

In the diagram Fig. 1 the switch-blades are shown in full lines in the positions they occupy when the car is running in one direction and in dotted lines in the positions they occupy while braking the car when running in the same direction. In order to run the car in the opposite direction it is, however, necessary to reverse the positions of the switches N N' without changing the position of the brake-switch C. Any suitable means may be used for accomplishing this result. In the accompanying drawings I have represented a movable arm U as attached to the rod O in such a manner that by adjusting it the switches N N' can be reversed without changing the position of the brake-switch C. The blade S of the brake-switch is pivoted at T in line with the rod O, or any convenient insulated support, and the blade is provided with two openings $z$ $z'$, Fig. 2, one on each side of the pivot. The arm U is arranged to turn on the rod O, and at its ends it is provided with lugs or pins $m$ $m'$, which engage with one of the openings $z$ $z'$ when the arm is turned sufficiently about the rod O. Suppose now that the switches occupy the positions indicated by the full lines in Fig. 1 and it is desired to reverse the direction of the motion of the electromotors. The operator turns the arm U on the rod O, so as to remove the pin $m$ from the opening $z$, the arm U now occupying the intermediate position shown by the dotted lines U', Fig. 2. The rod O is then moved lengthwise, changing the switches N N' from the positions indicated by the full lines to those shown by the dotted lines, but without moving the blade S of the switch C, as the arm U is now disconnected therefrom. The movement of the rod O lengthwise will shift the arm U to $U^3$, Fig. 1, in which position the pin $m'$ is engaged in the opening $z'$ in the blade S, as indicated by the dotted lines U'' in Fig. 2, by turning the arm U on the rod O. The switch-blade S will now be connected with the reverse-switches, so that every time they are operated the brake-switch will, as before, be opened on the contact R' and closed on the contact R. The hub of the arm U is insulated from the rod O, if necessary, by a sleeve $n'$, Fig. 3. The hub is provided with three notches, into which a spring engages, so as to hold the hub in any one of the three positions in which it can be set—that is, with one of the pins $m$ or $m'$ engaged in an opening in the switch-blade, as indicated by the full lines U or the dotted lines U'' in Fig. 2, or with both pins disengaged, as indicated at U'. This arrangement is indicated in Fig. 3, which is a sectional view taken through the hub of the arm U on the line 3 3, Fig. 1, showing the notches $s'$ $s''$ and the spring Z, which is attached to a sleeve $t''$ on the rod O. The notches are provided with inclined sides, and the surface of the spring which engages in the notches is made of a corresponding shape, so that the arm U is held in any position in which it is set, but may be shifted therefrom by the application of sufficient force, the spring yielding outward and entering another one of the notches as the arm is turned.

It will be understood that the contacts $q$ and $q''$ of the switch N are electrically connected together by the conductor $a''$, and that in a similar manner the contacts $q'''$ $q^5$ of the switch N' are connected together by the wire $a'$. When the car is being propelled, the current from the coils of the armature P' of the motor I' is carried through the brush $o'''$, wire $k'$, pivot $p'''$, and switch-blade $l'''$ to the contact $q^5$ and thence through the wires $i'''$ $t'$ $i''$ and the coils of the field-magnets L'' L''' to the contact $q^4$ and to ground through the switch-blade $l''$, pivot $p''$, and wire $j$. During the braking operation, the switch N' being reversed, the current will pass from the armature P' to rheostat G, arm F, brake-switch C, wire $u$, (conductor V, if used,) and wire $j$ to the switch N', completing the circuit through fields and armature-coils. The brushes $o'$ and $o'''$ of the two electromotors I I' are placed in electrical communication by means of the conductor A', which maintains these brushes at the same electric potential and prevents either motor from sending a current through the other. By means of the wire A' the slight current produced by the residual magnetism in the field-magnets is prevented from passing through the coils of the field-magnets, and in this way either of the motors is prevented from building up a current which would be discharged through the other. This conductor A' is provided with a switch $e''$, which is employed in connection with one of the switches $e$ $e'$ whenever it is desired to discontinue the use of either of the motors.

Any suitable means may be employed for shifting the arm U on the rod O, so as to disconnect the blade S of the brake-switch. The mechanism for this purpose (shown in the accompanying drawings) consists of a rock-shaft Y, Fig. 2, mounted in any suitable support and provided with the projecting arms $r''$ $r^3$, which bear against the arm U and serve to shift its position when the rock-shaft is turned. A suitable connection is provided between the rock-shaft and a handle located within the driver's reach on the body of the car, by which the rock-shaft is operated.

I claim—

1. The combination, with the electromotor and running-gear of an electric car, of a rheostat or variable resistance, means for opening the line-circuit, and suitable means for maintaining the direction of the current through the field-magnets constant when the motor is used as a generator and for directing the current so generated through the rheostat, substantially as described.

2. The combination, with the electromotor and running-gear of an electric car, of the reversing-switch N, whereby the direction of the current through the field-magnets of the electromotor can be controlled, so as to remain the same when the motor is used as a generator as when used as a motor, the brake-switch C, arranged to open the line and close the local circuit, and the rheostat or variable resistance G, substantially as described.

3. The combination, with the running-gear of an electric car, of a series-wound electromotor, a rheostat or variable resistance, a reversing-switch, and a brake-switch, substantially as described.

4. The combination, with the electromotor and running-gear of an electric car, of a single switch adapted to open the line-circuit and close the local circuit through the rheostat, the ground, and the motor, substantially as described.

5. The combination, with the electromotor and running-gear of an electric car, of a variable resistance, a brake-switch adapted to open the line-circuit, and suitable electrical connections whereby the line-current is directed through the brake-switch before flowing through the variable resistance, the armature, and field-magnets, substantially as described.

6. The combination, with the electric motor of an electric car, of the rheostat G, the reversing-switch N, the brake-switch C, and a suitable connection, as O, whereby the switches are operated simultaneously, substantially as described.

7. The combination, with the electric motor of an electric car, of the rheostat G, the reversing-switch N, the brake-switch C, connection O, and means for adjusting the relative positions of the switches, whereby the reversing-switch can be reversed without affecting the operation of the brake-switch, substantially as described.

8. The combination, in an electric car, of the electric motors I I', the rheostat G, the reversing-switches N N', the brake-switch C, and the conductor A', whereby the corresponding brushes of each motor are electrically connected, substantially as described.

9. The combination, in an electric car, of the electric motors I I', the rheostat G, the reversing-switches N N', the brake-switch C, the conductor A', whereby the corresponding brushes of each motor are electrically connected, the switch e'' in said conductor A', and another switch, as e or e', whereby either of the electromotors can be cut out of the circuit, substantially as described.

10. The combination, in an electric car, of the electromotor I, the reversing-switch N, the ground-wire j', the conductor u, leading from the ground-wire to the brake-switch, the brake-switch C, and the rheostat G, substantially as described.

11. The combination, with the electromotor and running-gear of an electric car, of a variable resistance, a brake-switch so arranged that when the braking action is taking place the line-circuit is open, and means for controlling the polarity of the residual magnetism of the field-magnets, substantially as described.

12. The combination, with the electromotor and running-gear of an electric car, of a variable resistance and a brake-switch arranged so that when the braking action is taking place the line-circuit is open, the blade of said switch being electrically connected to the variable resistance, and suitable electric connections between the variable resistance, the switch, the motor, and the ground, substantially as described.

JOHN C. LINCOLN.

Witnesses:
   GEO. B. SELDEN,
   C. G. CRANNELL.